US006974955B2

(12) United States Patent
Okada et al.

(10) Patent No.: US 6,974,955 B2
(45) Date of Patent: *Dec. 13, 2005

(54) RADIATION DETECTION DEVICE AND SYSTEM, AND SCINTILLATOR PANEL PROVIDED TO THE SAME

(75) Inventors: Satoshi Okada, Zama (JP); Yoshihiro Ogawa, Hachiouji (JP); Katsuro Takenaka, Kamizato (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/008,950

(22) Filed: Dec. 13, 2004

(65) Prior Publication Data

US 2005/0098733 A1    May 12, 2005

Related U.S. Application Data

(62) Division of application No. 10/224,654, filed on Aug. 21, 2002.

(30) Foreign Application Priority Data

Aug. 27, 2001 (JP) .............................. 2001-256518

(51) Int. Cl.[7] .............................................. G01T 1/20
(52) U.S. Cl. ............................................... 250/370.11
(58) Field of Search ........................... 250/361 R, 367, 250/370.11

(56) References Cited

U.S. PATENT DOCUMENTS

| 4,985,633 A | 1/1991 | Vieux et al. ............. 250/486.1 |
| 6,838,674 B2 * | 1/2005 | Otto ....................... 250/370.11 |

FOREIGN PATENT DOCUMENTS

| EP | 0 903 590 A1 | 3/1999 |
| JP | 2000-75038 A | 3/2000 |
| WO | WO 01/50500 A2 | 7/2001 |

OTHER PUBLICATIONS

Tornai, M.P., et al., "Investigation of micro-columnar scintillators on an optical fiber coupled compact imaging system." Nuclear Science Symposium Conference Record, 2000 IEEE, vol. 3, Iss., (Oct. 15-20, 2000), pp. 21/19-21/23 vol. 3.

* cited by examiner

*Primary Examiner*—Constantine Hannaher
(74) *Attorney, Agent, or Firm*—Fitzpatrick, Cella, Harper & Scinto

(57) ABSTRACT

In a radiation detection device in which light that is generated at a phosphor layer based on absorbed radiation, the phosphor layer being constituted by connecting side faces of columnar phosphors to each other, is converted into an electric charge at a photoelectric conversion element portion and radiation is detected based on the electric charge, the phosphors have larger column diameters in peripheral regions of the phosphor layer than in a central region thereof. Further, the phosphor layer has a film thickness that is smaller in its peripheral regions than in a central region thereof, thereby preventing breakage of the phosphors.

7 Claims, 5 Drawing Sheets

RADIATION DETECTION DEVICE AND SYSTEM, AND SCINTILLATOR PANEL PROVIDED TO THE SAME

This application is a division of U.S. application Ser. No. 10/224,654, filed Aug. 21, 2002, the entire content of which is incorporated herein by reference.

BACKGROUND OF THE INVENTION

1. Field of the Invention

The present invention relates to a radiation detection device and system, and a scintillator panel provided to the same. More specifically, the invention relates to a radiation detection device and system for use in medical diagnostic devices or non-destructive inspection devices, and to a scintillator panel provided to the same.

It is to be noted that the types of radiation discussed in this specification include electromagnetic waves such as X-rays, alpha rays, beta rays, and gamma rays.

2. Related Background Art

There has been an accelerating trend in recent years toward digitalization in the field of medical equipment, which has also prompted a paradigm shift in the method of roentgen photography from the conventional film and screen method toward x-ray digital radiography.

Examples of x-ray detection devices for use in roentgen photography employing the x-ray digital radiography include those having a sensor panel and a scintillator panel bonded to each other using an adhesive layer composed of transparent adhesive. Here, the sensor panel is provided with a photoelectric conversion element portion that comprises a photosensor and a TFT that are formed of amorphous silicon or the like. The scintillator panel comprises a phosphor layer consisting of columnar phosphors, and a reflecting film such as a metallic thin film for reflecting visible light emitted from the phosphor layer in the direction of the sensor panel.

In such x-ray detection devices, there are no restrictions regarding the structure of elements constituting the sensor panel or the materials for the phosphors used in the scintillator panel. Therefore, these devices may be implemented in various useful combinations determined as appropriate according to their intended applications.

Incidentally, there are several methods for bonding a scintillator panel and a sensor panel to each other using an adhesive layer. For one, there is sometimes employed a method in which adhesive is applied between the scintillator panel and the sensor panel, and a roller that is pressed against the scintillator panel from above is rotated in a state where the two panels are arranged opposing each other, thereby bonding the two panels together.

However, in such conventional art, there are instances where a load that acts on the phosphors upon pressing the roller against the scintillator panel causes a part of the phosphors to break. In particular, even when the same pressing load is applied, since dispersion of the load is interrupted on end faces of phosphors located in peripheral regions of the scintillator panel, the phosphors layer inevitably experiences greater pressing pressure acting in the vicinity of its end faces than in a central region thereof.

Should a phosphor be broken, light scatters within the phosphor, which causes unwanted blurs to appear on a photographed image. Thus, there exits a need to prevent occurrence of this phenomenon.

SUMMARY OF THE INVENTION

The present invention has been devised in view of the above-mentioned drawbacks of the prior art. Therefore, an object thereof is to prevent phosphors from being broken during a manufacturing step for adhering the scintillator panel and the sensor panel to each other.

In order to attain the above object, according to the present invention, there is provided a radiation detection device in which: a phosphor layer generates light based on absorbed radiation, the phosphor layer being constituted by connecting side faces of columnar phosphors to each other; the light is converted into an electric charge by a photoelectric conversion element portion; and radiation is detected based on the electric charge, the device being characterized in that column diameters of the respective phosphors are larger in peripheral regions of the phosphor layer than in a central region thereof.

That is, according to the present invention, the phosphors located in peripheral regions of the phosphor layer are imparted with greater mechanical strength to protect them against breakage that may occur at the time when the scintillator panel comprising the phosphor layer and the sensor panel comprising the photoelectric conversion element portion are bonded together using a roller.

Note that contrast transfer function tends to decrease as the column diameter of the phosphor becomes larger. Therefore, for applications where the contrast transfer function is an important consideration, the film thicknesses of phosphors located in peripheral regions of the phosphor layer may be made comparatively small.

Further, according to the present invention, there is also provided a radiation detection system characterized by comprising the radiation detection device of the present invention.

Still further, according to the present invention, there is provided a scintillator panel characterized by comprising the phosphor layer that is employed in the radiation detection device of the present invention.

Other feature and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DESCRIPTION OF THE PREFERRED EMBODIMENTS

Embodiments of the present invention will be described hereinbelow with reference to the accompanying drawings.

Embodiment 1

Figure 1:
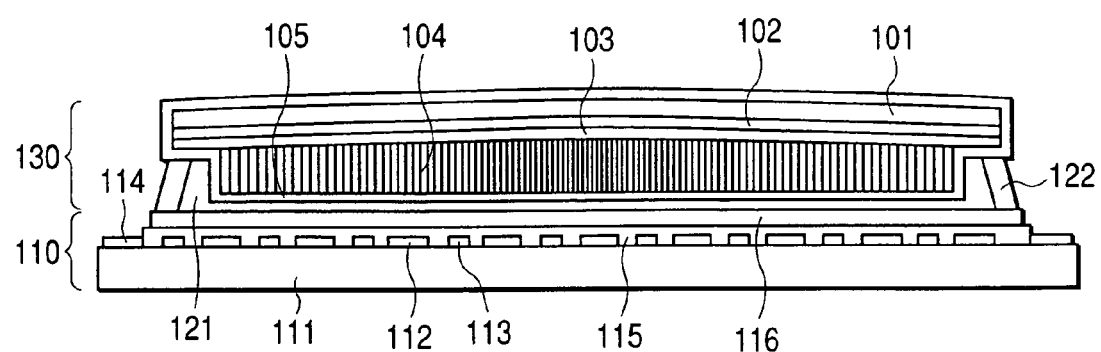
FIG. 1 is a schematic cross-sectional view of a radiation detection device according to Embodiment 1 of the present invention.

FIG. 1 is a schematic cross-sectional view of a radiation detection device according to Embodiment 1 of the present invention.

Referring to FIG. 1, reference numeral 130 denotes a scintillator panel. The scintillator panel 130 is composed of: an alkali halide phosphor layer 104 in which side faces of columnar crystallized phosphors are connected to each other and which generates light based on absorbed radiation; a base member 101 formed of amorphous carbon or the like for supporting the alkali halide phosphor layer 104; a reflecting layer 103 formed of an aluminium thin film for reflecting light that is converted at the alkali halide phosphor layer 104, toward a sensor panel 110 that will be described later; an insulating protective layer 102 formed of polyimide or the like, which is formed between the base member 101 and the reflecting layer 103; and a protective layer 105 formed of an organic resin for protecting the alkali halide phosphor layer 104 and the like from the outside air.

Further, in FIG. 1, reference numeral 110 denotes the sensor panel. The sensor panel 110 includes a glass substrate 111 on which there are formed: a photoelectric conversion element portion 112 comprising a photosensor and a TFT that are formed of amorphous silicon; a wiring portion 113 for transmitting an electric signal that is converted at the photoelectric conversion element portion 112; and an electrode lead portion 114 for leading out to the outside the electric signal transmitted through the wiring portion 113. Over these portions are further formed a first protective layer 115 formed of silicon nitride or the like, and a second protective layer 116 formed of polyimide or the like.

The sensor panel 110 and the scintillator panel 130 are bonded to each other with adhesive 121, and are sealed with a sealing material 122.

Note that the photoelectric conversion element portion 112 may take any forms insofar as it is capable of detecting visible light from the alkali halide phosphor layer 104. Accordingly, both of MIS and PIN sensors that are formed of amorphous silicon or the like may be employed as the sensor, while a TFT or a PIN diode switch may be employed as the switch. Further, a CMOS sensor or a CCD image pickup element may also be employed. In this case, crystal silicon is used instead of the glass substrate 111.

Figure 2:
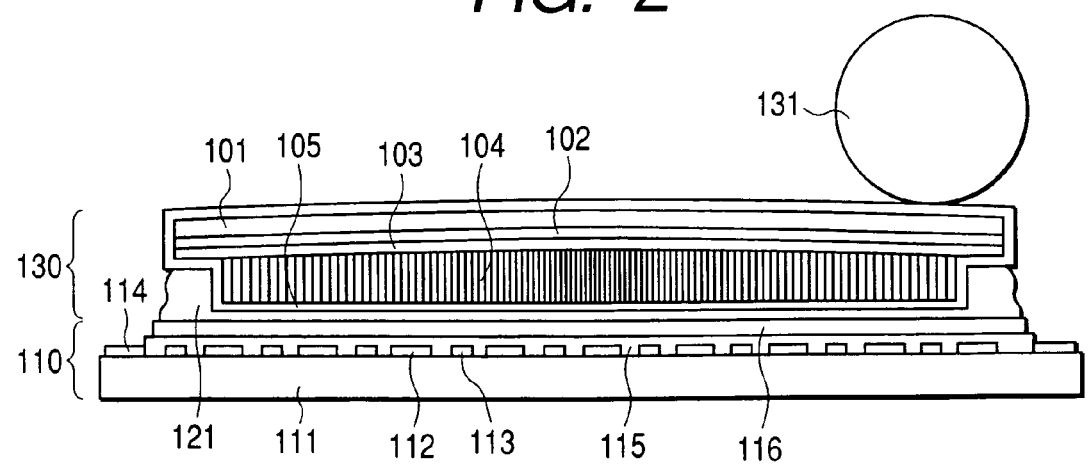
FIG. 2 is a cross-sectional view showing a state in which a scintillator panel 130 shown in FIG. 1 is being bonded to a sensor panel 110.

Note that a plurality of the radiation detection devices shown in FIG. 1 may be tiled up as appropriate in accordance with their intended applications. Further, the scintillator panel 130 is depicted in FIG. 1 as having the base member 101, the insulating layer 102, the reflecting layer 103, and the alkali halide phosphor layer 104 which are laminated in the stated order as seen from the top in the figure. However, alternatively, the reflecting layer 103, the insulating layer 102, the base member 101, and the alkali halide phosphor layer 104 may be laminated in the stated order. FIG. 2 is a cross-sectional view showing a state where the scintillator panel 130 of FIG. 1 is being bonded to the sensor panel 110. Referring to FIG. 2, the adhesive 121 is applied between the scintillator panel 130 and the sensor panel 110, and a roller 131 that is pressed against the scintillator 130 from above is rotated in the state where the two panels are arranged opposing each other, thereby bonding them together.

In accordance with Embodiment 1, the column diameters of the columnar crystallized phosphors that make up the alkali halide phosphor layer 104 become larger progressively from a central region of the phosphor layer to its peripheral regions outside the central region.

This is to ensure that the phosphors located in peripheral regions of the alkali halide phosphor layer are prevented from being broken due to pressure applied thereon, since the alkali halide phosphor layer 104 experiences greater pressing pressure acting on its peripheral regions than on a central region thereof when the roller 130 is rotated on the scintillator panel 130.

Furthermore, the alkali halide phosphor layer 104 is shaped so as to have, for example, a domed top surface, by setting progressively decreasing film thickness for the phosphors located at its peripheral regions outside the central region thereof. The reasons for this arrangement are explained below.

Figure 5:
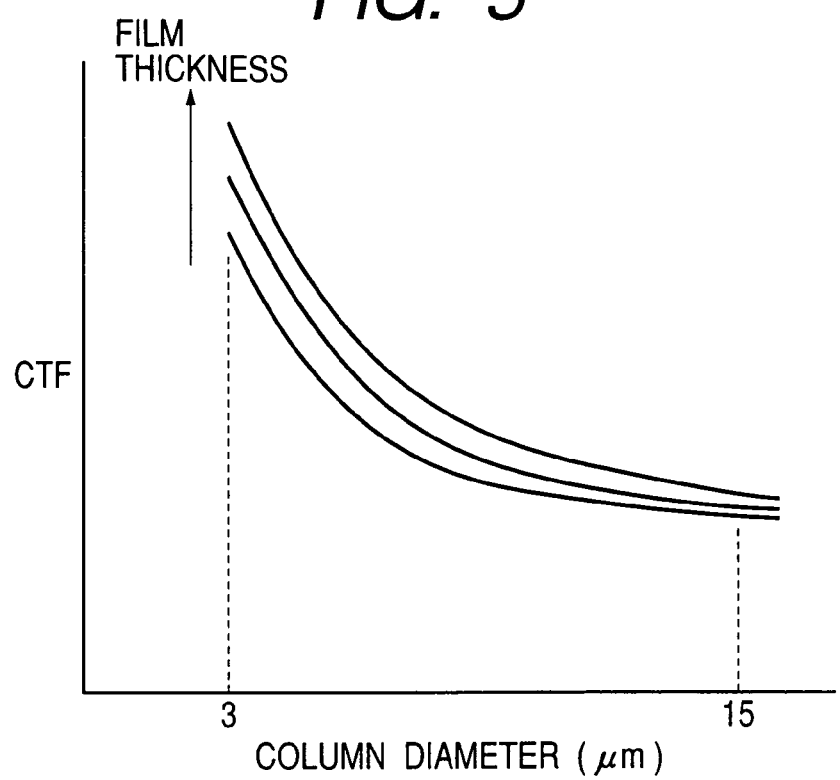
FIG. 5 is a graph indicating a relationship between phosphor column diameter and contrast transfer function (CTF)

FIG. 5 is a graph indicating a relationship between phosphor column diameter and contrast transfer function (abbreviated hereinafter as "CTF"). In FIG. 5, the abscissa indicates column diameter and the ordinate indicates CTF. As can be seen from FIG. 5, CTF decreases as the phosphor column diameter becomes larger.

Further, if the column diameter is the same, a phosphor having a larger film thickness has higher CTF.

Figure 6:
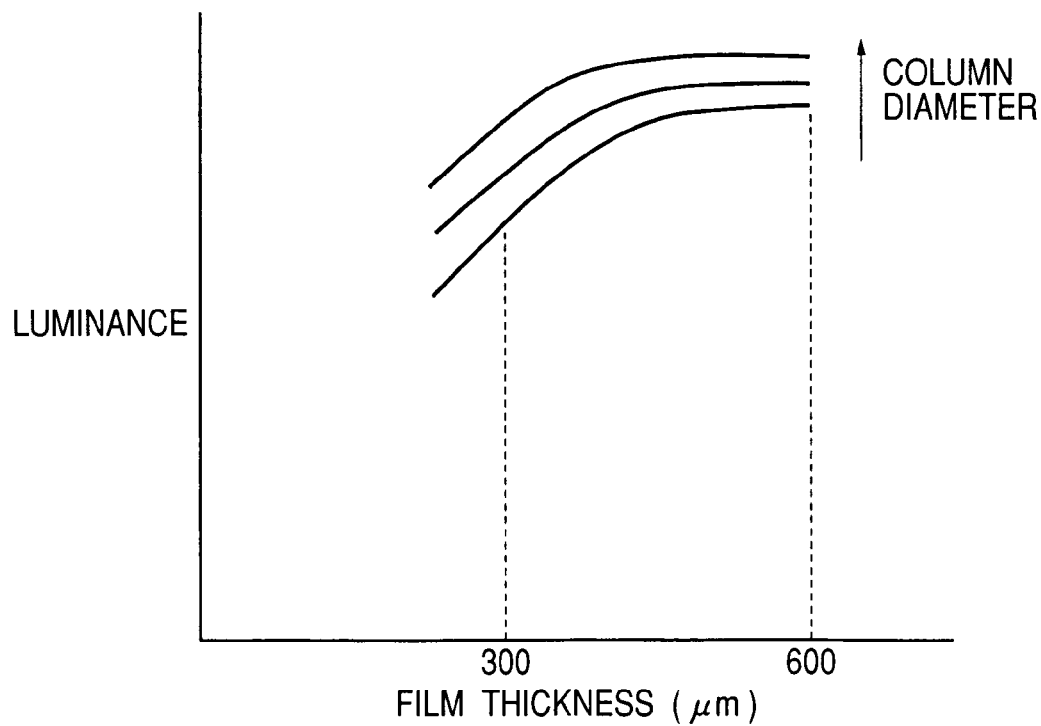
FIG. 6 is a graph indicating a relationship between phosphor film thickness and luminance.

FIG. 6 is a graph indicating a relationship between phosphor film thickness and luminance. In FIG. 6, the abscissa indicates film thickness of phosphor column, and the ordinate indicates luminance. As can be seen from FIG. 6, luminance increases as phosphor film thickness becomes greater.

Further, if the phosphor film thickness is the same, luminance increases as phosphor column diameter becomes larger.

It is to be noted that luminance reaches saturation at the phosphor film thickness of approximately 600 $\mu$m. Therefore it is conceivable that luminance will conversely decrease with a film thickness larger than that value.

In light of the above discussion, the configuration of the phosphor may be determined as appropriate according to the size of the photoelectric conversion element portion and the size of the base member 101, with the column diameter being within the range of 3 $\mu$m to 15 $\mu$m and the film thickness being within the range of 300 $\mu$m to 600 $\mu$m.

Note that the data on phosphor column diameter is obtained through measurement using a laser microscope (VK-8500 from KEYENCE CORPORATION) after vapor-depositing the alkali halide phosphor layer on the base.

Next, description will turn to procedures for forming the alkali halide phosphor layer 104.

Figure 7:
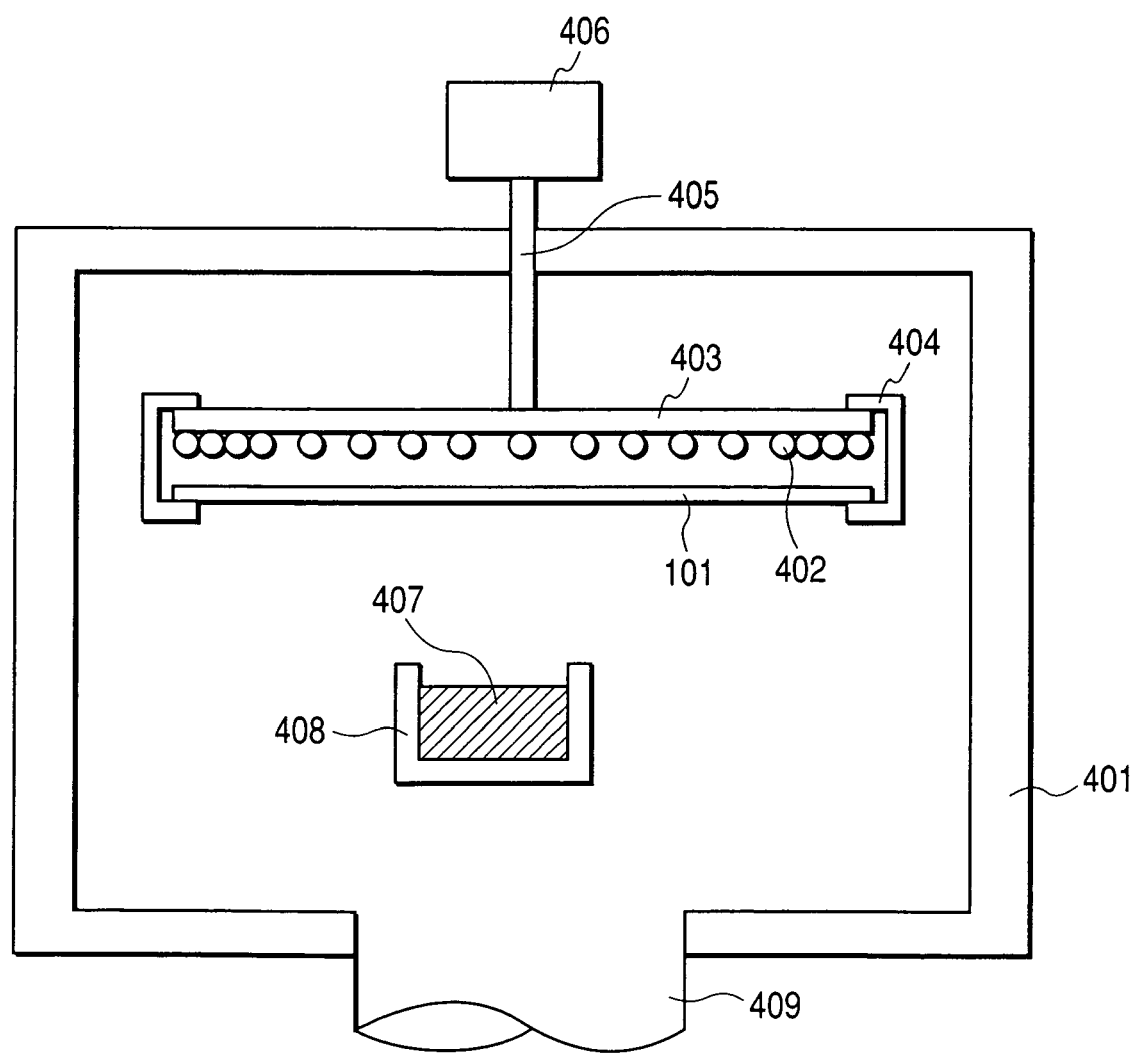
FIG. 7 is a schematic cross-sectional view of a vapor-deposition apparatus for forming an alkali halide phosphor layer 104.

FIG. 7 is a schematic cross-sectional view of a vapor-deposition apparatus used for forming the alkali halide phosphor layer 104. Referring to FIG. 7, reference numeral 401 denotes a vacuum chamber, and reference numeral 402 denotes a heater for heating the base member 101. A plurality of the heaters 402 make up a bundle. Within the bundle of heaters 402, heaters are more densely arranged in outer regions thereof. Reference numeral 403 denotes a heat reflecting plate for reflecting heat generated from the heater 402, in the direction of the base member 101. Also provided are a holder 404 for supporting the base member 101, a rotary shaft 405, and a motor 406 for rotating the base member 101 and the like.

Further, reference numeral 407 denotes raw material for the alkali halide phosphor. Reference numeral 408 denotes a heating board 408 for heating and vaporizing the raw material 407 for the alkali halide phosphor, which heating board is capable of being shifted in both its vertical and lateral positions. Reference numeral 409 denotes an exhaust pipe, which is connected to a not-shown pump for keeping the entire interior portion of the vacuum chamber 40 to a vacuum.

As the heating board 408 is heated, the raw material 407 for the alkali halide phosphor which is contained within the heating board 408 starts to melt and evaporate, allowing its vapor-deposition onto the base member 101.

In a case where TI or the like is to be additionally doped, halogenated material may be placed in another heating board (not shown) and individually evaporated. Characteristically, the column diameter of an alkali halide phosphor, especially CsI, tends to become larger as the temperature of the base member 101 becomes higher. Further, the material for vapor deposition evaporates as it travels through space three-dimensionally from an evaporation source, that is, from the heating board 408. Thus, the closer an area of deposition is to the evaporation source, the thicker the obtained deposition will become in that area.

Here, the heaters 402 are more densely arranged in outer regions and hence the base member 101 tends to have progressively higher temperature in its outer regions. Consequently, upon vapor deposition, the column diameter will become progressively larger in outer regions of the resulting layer.

Further, a fine control of the column diameter can be performed by dividing the bundle of heaters 402 into a plurality of blocks and individually controlling each of the blocks. Since the heating board 408 is basically set at a position corresponding to a central region of the base member 101, an alkali halide phosphor that is vapor-deposited onto the central region of the base member 101 will have a comparatively large thickness.

Further, while the base member 101 is being rotated, by shifting the heating board 408 in its vertical position as well as in a direction from the central region of the base member 101 toward outer regions thereof, a fine control can be performed regarding film thickness distribution.

The term "alkali halide phosphor" as used herein refers to CsI, NaI, CsBr, or the like which is doped with TI and Na.

The base member 101 and the like has a curved configuration so as to conform with the shape of the top surface of the alkali halide phosphor layer 104. Here, provided that the size of the base member 101 is 450, when the alkali halide phosphor layer 104 is formed to have a dome-like configuration such that its column diameter is approximately 6 $\mu$m in its central region and approximately 9 $\mu$m at its end portions and its film thickness is approximately 550 $\mu$m in its central region and approximately 500 $\mu$m at its end portions, it is possible to obtain a substantially flat luminance distribution profile and suppress CTF to 10% or lower at 1.5 lp.

Embodiment 2

Figure 3:
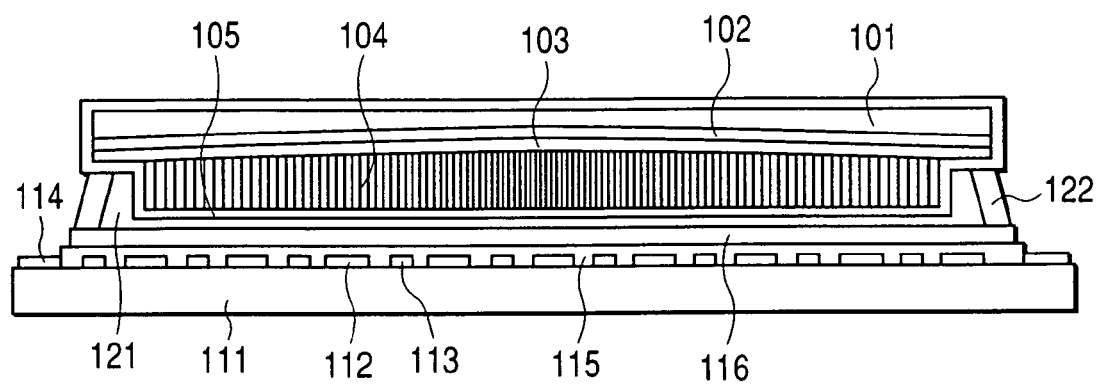
FIG. 3 is a schematic cross-sectional view of a radiation detection device according to Embodiment 2 of the present invention.

FIG. 3 is a schematic cross-sectional view of a radiation detection device according to Embodiment 2 of the present invention. Note that like reference numerals are used in FIG. 3 to denote portions that are identical to those shown in FIG. 1.

In the radiation detection device shown in FIG. 3, the bottom surface of the base member 101 shown in FIG. 1 has a concave configuration so as to conform with the shape of the top surface of the alkali halide phosphor layer 104. Thus, the top surface of the base member 101 being the surface on which the roller 131 is rotated can be made flat. Note that aluminium is used for the base member 101.

If the surface on which the roller 131 rotates is flat as described above, the column diameter and the height of the alkali halide phosphor layer 104 are not necessarily limited to the numerical values described in Embodiment 1 but may be determined as appropriate according to the magnitude of stress exerted on the scintillator panel 130 side upon rotating the roller 131.

Embodiment 3

Figure 4:
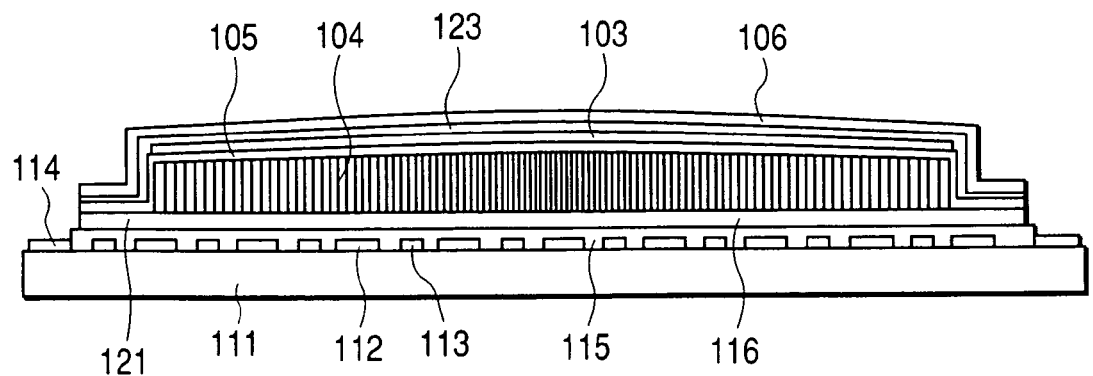
FIG. 4 is a view showing the construction of a radiation detection device according to Embodiment 3 of the present invention.

FIG. 4 is a view showing the construction of a radiation detection device according to Embodiment 3 of the present invention. Referring to FIG. 4, reference numeral 106 denotes a protective film for protecting the reflecting layer 103 from water, and reference numeral 123 denotes an adhesive layer for adhering the protective film 106 to the reflecting layer 103. Note that like reference numerals are used in FIG. 4 to denote portions that are identical to those shown in FIG. 1.

In Embodiment 3, the alkali halide phosphor layer 104 is directly vapor-deposited onto the sensor panel 110, thus eliminating stress that would be otherwise applied when establishing optical coupling with the sensor panel 110.

It is to be noted that the protective film 106 is adhered to the reflecting layer 103 using the roller 131, for example, in the manner as shown in FIG. 2. Also in this case, the alkali halide layer is protected against breakage by constituting it in the fashion as depicted in FIG. 1 and the like.

Embodiment 4

Figure 8:
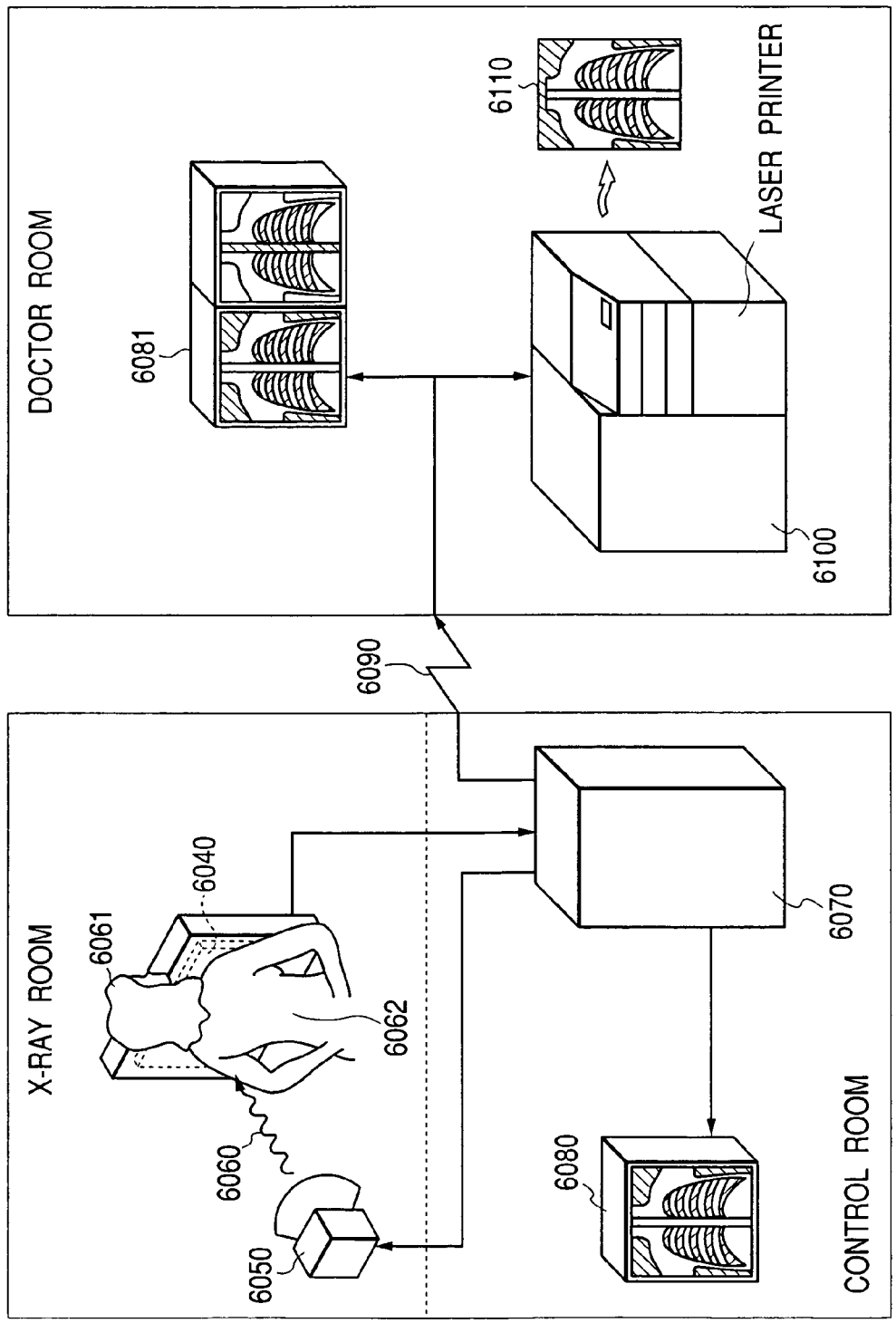
FIG. 8 is a schematic illustration showing the configuration of a radiation detection system according to Embodiment 4 of the present invention.

FIG. 8 schematically illustrates the configuration of a radiation detection system according to Embodiment 4 of the present invention. X-rays 6060 generated at an X-ray tube 6050 are transmitted through a chest portion 6062 of a patent or subject 6061 and enter a radiation detection device 6040 as set forth in any one of Embodiments 1 through 3.

The incident X-rays contain information on anatomical features of the patient 6061. The phosphors emit light in response to the incidence of X-rays and photoelectrically convert the light to obtain electrical information. The electrical information is digital-converted and then subjected to image processing by an image processor 6070, to be observed on a display 6080 placed in a control room.

Further, the above information can be transferred to a remote location through a data transmission means such as a telephone line 6090. The information can be then displayed on a display 6081 placed in a doctor room and the like in another location or saved into a storage medium such as an optical disc, thus allowing medical diagnosis of the information by a doctor in a remote location. Further, the information may also be recorded to a film 6110 using a film processor 6100.

As has been described above, in accordance with the present invention, the phosphors are imparted with greater mechanical strength to prevent them from being broken in the process of manufacturing the device, whereby an image that is free from blurs can be obtained.

As many apparently widely different embodiments of the present invention can be made without departing from the spirit and scope thereof, it is to be understood that the invention is not limited to the specific embodiments thereof except as defined in the claims.

What is claimed is:

1. A radiation detection device comprising:
a sensor panel, having a plurality of photoelectric conversion portions disposed on a substrate;
a scintillator panel bonded via an adhesive to the sensor panel and comprising a supporting member and a phosphor layer disposed on the supporting member, the phosphor layer comprising a plurality of columnar crystallized phosphors of which side faces are connected to each other, wherein the phosphor layer converts a radiation into light which can be sensed by the photoelectric conversion portions, and
wherein the phosphors in a peripheral region of the phosphor layer have larger column diameters than the phosphors in a central region of the phosphor layer.

2. The device according to claim 1, wherein
the phosphors in an end of the phosphor layer have lengths shorter than the phosphors in the central region of the phosphor layer.

3. The device according to claim 1, wherein
the phosphors are alkali halide phosphors.

4. A radiation detection system comprising a radiation detection device according to claim 1, and an X-ray source which generates X-rays.

5. A scintillator panel comprising:
a supporting member; and
a phosphor layer disposed on the supporting member, the phosphor layer comprising a plurality of columnar crystallized phosphors of which side faces are connected to each other, wherein the phosphor layer converts a radiation into light which can be sensed by photoelectric conversion portions, and
wherein the phosphors in a peripheral region of the phosphor laser have larger column diameters than the phosphors in a central region of the phosphor layer.

6. The scintillator panel according to claim 5, wherein
the phosphors in an end of the phosphor layer have lengths shorter than the phosphors in the central region of the phosphor layer.

7. The scintillator according to claim 5, wherein
the phosphors are alkali halide phosphors.

* * * * *

UNITED STATES PATENT AND TRADEMARK OFFICE
CERTIFICATE OF CORRECTION

PATENT NO. : 6,974,955 B2 Page 1 of 1
DATED : December 13, 2005
INVENTOR(S) : Satoshi Okada et al.

It is certified that error appears in the above-identified patent and that said Letters Patent is hereby corrected as shown below:

Column 1,
Line 66, "exits" should read -- exists --.

Column 2,
Line 40, "feature" should read -- features --.

Column 8,
Line 13, "laser" should read -- layer --.
Line 19, "scintillator" should read -- scintillator panel --.

Signed and Sealed this

Twenty-third Day of May, 2006

JON W. DUDAS
*Director of the United States Patent and Trademark Office*